United States Patent
Jung

(10) Patent No.: US 8,079,209 B2
(45) Date of Patent: Dec. 20, 2011

(54) UREA-SCR SYSTEM AND CONTROL METHOD THEREOF

(75) Inventor: Jaeyoon Jung, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 534 days.

(21) Appl. No.: 12/392,818

(22) Filed: Feb. 25, 2009

(65) Prior Publication Data

US 2009/0217644 A1 Sep. 3, 2009

(30) Foreign Application Priority Data

Mar. 3, 2008 (KR) ........................ 10-2008-0019762

(51) Int. Cl.
*F01N 3/00* (2006.01)
(52) U.S. Cl. ................ 60/277; 60/274; 60/286; 60/295; 60/297; 60/301; 60/311
(58) Field of Classification Search .................... 60/274, 60/277, 286, 295, 297, 301, 303, 311
See application file for complete search history.

(56) References Cited

U.S. PATENT DOCUMENTS

| | | | | |
|---|---|---|---|---|
| 5,522,218 A | * | 6/1996 | Lane et al. ...................... | 60/286 |
| 6,063,350 A | * | 5/2000 | Tarabulski et al. .......... | 423/239.1 |
| 6,487,852 B1 | * | 12/2002 | Murphy et al. ................. | 60/286 |
| 7,861,518 B2 | * | 1/2011 | Federle .......................... | 60/286 |
| 7,946,109 B2 | * | 5/2011 | Potter et al. .................... | 60/286 |
| 7,954,311 B2 | * | 6/2011 | Shaikh et al. .................. | 60/266 |
| 7,954,312 B2 | * | 6/2011 | Gresens ......................... | 60/286 |
| 2007/0163245 A1 | * | 7/2007 | Sheridan et al. .............. | 60/286 |

* cited by examiner

*Primary Examiner* — Thomas E. Denion
*Assistant Examiner* — Diem Tran
(74) *Attorney, Agent, or Firm* — Morgan, Lewis & Bockius LLP

(57) ABSTRACT

A method for controlling an urea-SCR system may include a first step for calculating a target urea injection amount, a second step that uses urea injection pressure and urea injection time to calculate a real urea injection amount, a third step that calculates a difference value between the target urea injection amount and the real urea injection amount, and monitors the difference value at a predetermined time interval, a fourth step that accumulates difference values for a determined time when the difference value exceeds a predetermined level, and transfers an alarm signal to a driver when the average value thereof exceeds a predetermined level, and/or a fifth step that starts to accumulate a number of engine starts and driving distance after transferring the alarm signal, and when the number of engine starts is larger than a predetermined value or the driving distance is longer than a predetermined value, if the difference value does not become lower than a predetermined level, executes urea recharging means for a driver to charge a urea tank with a urea solution. The urea consumption amount may be continuously monitored, the remained urea amount may be accurately detected, and the urea recharging may be induced in time such that the nitrogen oxide exhaust is prevented.

12 Claims, 2 Drawing Sheets

UREA-SCR SYSTEM AND CONTROL METHOD THEREOF

CROSS-REFERENCE TO RELATED APPLICATION

The present application claims priority of Korean Patent Application Number 10-2008-0019762 filed Mar. 3, 2008, the entire contents of which application is incorporated herein for all purposes by this reference.

BACKGROUND OF THE INVENTION

1. Field of the Invention

The present invention relates to a urea-SCR system and a control method thereof.

2. Description of Related Art

Recently, owing to environmental pollution, related investigations have been actively undertaken so as to eliminate nitrogen oxide in exhaust gas, and the post-processing technology such as selective catalyst reduction (SCR) can be divided into two kinds.

First, there is a lean $NO_x$ trap (LNT) system in which a nitrogen oxide absorbing material is used. However, in order to use the above LNT system, a diesel engine is to be operated in a condition of less than a theoretical air/fuel ratio.

That is, in order to archive the lean air and rich fuel condition, a post-injection technique is to be used, that is, the fuel is further injected into an exhaust pipe such that the fuel consumption is increased.

Second, in order to eliminate the nitrogen oxide, there is a urea-SCR (urea-selective catalyst reduction system) that injects a urea solution into the exhaust pipe so as to eliminate the nitrogen oxide in the exhaust gas, and the injected urea is vaporized by thermal energy (at about 156° C.) of the exhaust gas or is decomposed by the catalyst to be transformed to ammonia, wherein the Reaction Formula 1 thereof is as follows.

Reaction Formula 1

$$(NH_2)_2CO + H_2O \rightarrow 2NH_3 + CO_2 \qquad \text{Eq. (1)}$$

The transformed ammonia reduces the nitrogen oxide in the exhaust pipe as in the following Reaction Formula 2 such that nitrogen and water are exhausted as the resultant materials thereof.

Reaction Formula 2

$$4NH_3 + 4NO + O_2 \rightarrow 4N_2 + 6H_2O \qquad \text{Eq. (2)}$$

$$4NH_3 + 2NO_2 + O_2 \rightarrow 3N_2 + 6H_2O \qquad \text{Eq. (3)}$$

$$8NH_3 + 6NO_2 \rightarrow 7N_2 + 12H_2O \qquad \text{Eq. (4)}$$

$$2NH_3 + NO + NO_2 \rightarrow 2N_2 + 3H_2O \qquad \text{Eq. (5)}$$

The above technique that uses the ammonia to reduce the nitrogen oxide was developed about 20 years ago to be commercially available, and a detailed description thereof will be omitted.

Different from the final guidance program (distributed on Mar. 30, 2007) of the North American EPA for a vehicle, in which the urea-SCR is used, European laws stipulate that a reducing agent such as urea is to be monitored in a urea-SCR vehicle. Accordingly, in order to correspond to the above program, the control logic thereof needs to be investigated.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a urea-SCR system and a control method thereof having advantages of effectively diagnosing the urea consumption amount and recharging the urea solution.

A method for controlling an urea-SCR system may include a first step of calculating a target urea injection amount, a second step that uses urea injection pressure and urea injection time to calculate a real urea injection amount, a third step that calculates a difference value between the target urea injection amount and the real urea injection amount, and monitors the difference value at a predetermined time interval, a fourth step that accumulates difference values for a determined time when the difference value exceeds a predetermined level, and transfers an alarm signal to a driver when the average value thereof exceeds a predetermined level, and/or a fifth step that starts to accumulate a number of engine starts and driving distance after transferring the alarm signal, and when the number of engine starts is larger than a predetermined value or the driving distance is longer than a predetermined value, if the difference value does not become lower than a predetermined level, executes urea recharging means for a driver to charge a urea tank with a urea solution.

Engine speed and fuel supply amount are measured and an initial $NO:NO_2$ ratio value among initial $NO_x$ is detected, a $NO_2$ increment that is estimated through temperature of a diesel oxidation catalyst (DOC) and a $NO_2$ decrement that is analyzed through a pressure difference change amount through a catalytic particulate filter (CPF) temperature and continuous regeneration trap (CRT) effectiveness are reflected or related to the initial $NO:NO_2$ ratio value to calculate a final $NO:NO_2$ ratio value, and thereby a reaction molecular ratio with the $NH_3$ and $NO_x$ purification efficiency of the SCR catalyst is determined to calculate the target urea injection amount in the first step.

The real urea injection amount value may be displayed on a cluster in real time for the driver to check the real urea injection amount in the second step.

The fourth step may further include a step that, if the difference value between the target urea injection amount and the real urea injection amount is less than the predetermined value, updates the average difference value at a predetermined cycle based on the accumulation value of the driving distance. Further, the urea recharging means may include an output reduction logic that reduces the output of the engine and a restarting restriction logic that causes the engine to not be restarted in the fifth step. If the difference value is larger than the predetermined value, the output restriction logic or the restarting restriction logic may be operated, if the number of engine starts after transferring the alarm signal is larger than a predetermined value or the accumulation value of the driving distance is longer than a predetermined value after generating the alarm signal.

A selective catalyst reduction device control system may include a selective catalyst reduction device that is mounted on an exhaust pipe so as to eliminate nitrogen oxide that is included in exhaust gas, a urea tank in which a urea solution is stored, an injector that injects the urea solution that is supplied from the urea tank, and a control portion that calculates a target injection amount and a real injection amount that is to be injected from the injector, and if the difference value between the target injection amount and the real injection amount is larger than a predetermined value, generates an alarm signal. The control portion includes a counting portion that counts a number of engine starts after generating the alarm signal, an accumulating portion that accumulates the driving distance after generating the alarm signal, and a recharging induction portion that generates a recharging signal for recharging the urea tank with a urea solution if the difference value is larger than the predetermined value, if the number of engine starts or the accumulated driving distance is larger than the predetermined value.

The recharging induction portion may prevent the engine from being started.

The recharging induction portion may restrict the engine output so that the amount of exhaust gas is decreased.

The control portion may update the average of the difference value at a predetermined cycle, when the difference value between the target injection amount and the real injection amount is less than the predetermined value.

An alarm lamp or an alarm sound (voice) may be turned on by the alarm signal.

A recharging lamp or a recharging sound (voice) may be turned on by the recharging signal.

In the present invention, the urea consumption amount may be continuously monitored, a remaining urea amount may be accurately detected, and the urea recharging may be induced in time such that nitrogen oxide exhausting may be prevented.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
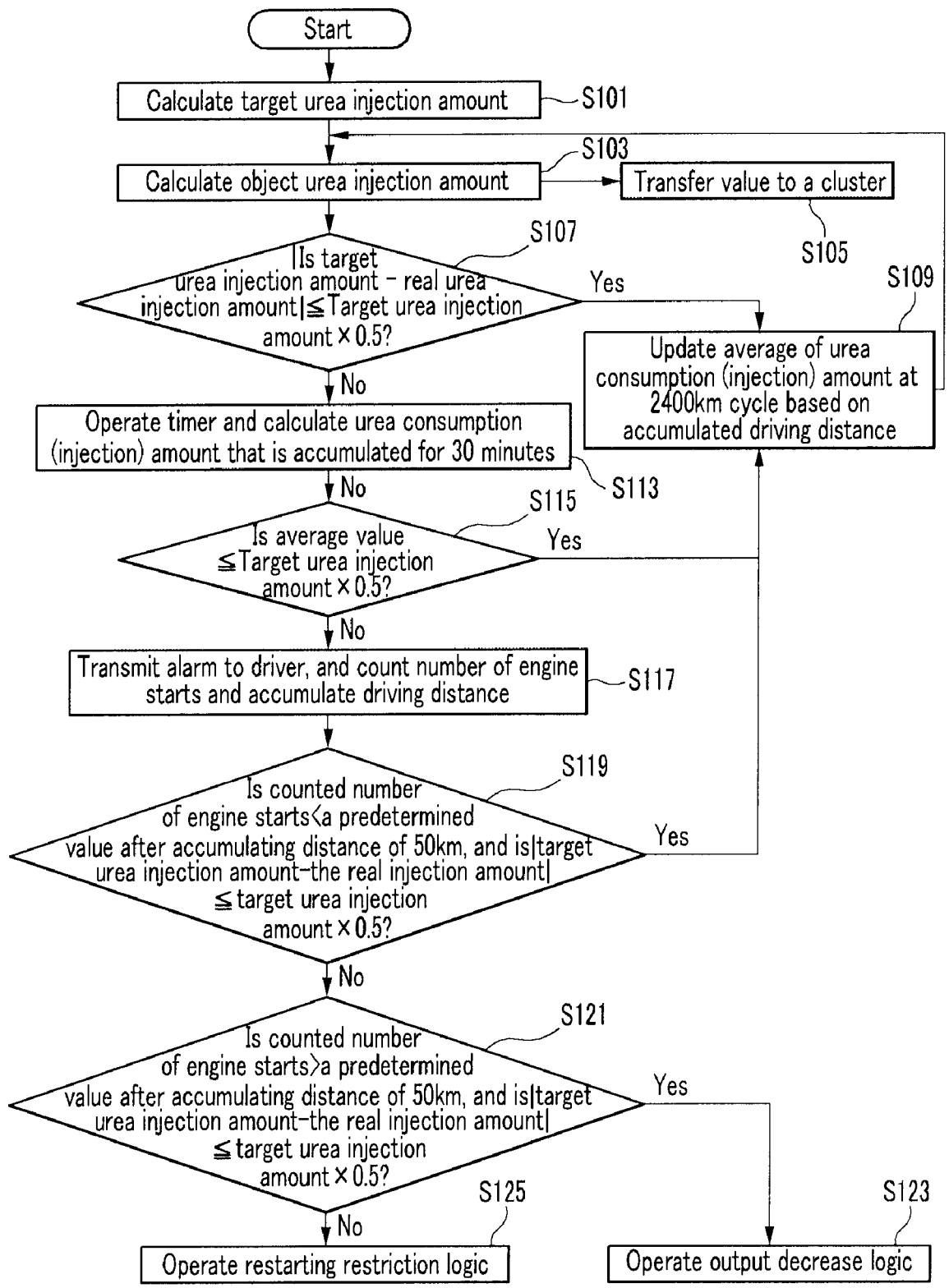
FIG. 1 is a flowchart showing an exemplary method for controlling a urea-SCR system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, referring to the drawings, various embodiments of a method for controlling a urea-SCR system control according to the present invention is detailed.

FIG. 1 is a flowchart showing a method for controlling a urea-SCR system according to various embodiments of the present invention.

According to the driving condition of an engine of a vehicle, a target urea injection amount is calculated (S101).

In this process, the target urea injection amount may be calculated as follows. First, engine speed and fuel supply amount are measured and an initial $NO:NO_2$ ratio value of initial $NO_x$ is detected, and a $NO_2$ increment that is estimated through the temperature of the DOC and the $NO_2$ decrement that is analyzed through a pressure difference change amount through the catalytic particulate filter (CPF) temperature and continuous regeneration trap (CRT) effectiveness are reflected or related to the initial $NO:NO_2$ ratio value to calculate a final $NO:NO_2$ ratio value, and thereby a reaction molecular ratio with the $NH_3$ and $NO_x$ purification efficiency of the SCR catalyst are determined to calculate the target urea injection amount.

Also, the $NO_2$ increment amount may be calculated as follows. First, the oxidation amount of HC inside a diesel oxidation catalyst (DOC) is measured by an exhaust gas temperature sensor, and then the increment amount of the DOC temperature is measured according to the oxidation amount of the HC that is measured above to calculate the $NO_2$ increment amount.

The $NO_2$ decrement amount may be calculated as follows. First, it is determined whether an amount of soot that is loaded inside the CPF is larger than a predetermined amount by a signal of a pressure difference sensor and it is determined whether the exhaust gas temperature reaches a CRT condition by an exhaust gas temperature sensor in a CPF, and then the pressure difference value during a CRT is measured by the pressure difference sensor to calculate the $NO_2$ decrement amount.

Next, the urea injection pressure and the urea injection time may be measured to calculate the real urea injection amount (S103), and the value is transferred to a cluster (S105). At this time, the urea injection pressure is generally maintained at a uniform pressure (5 bar), and so the real urea injection amount is accurately calculated by accumulating the number of injections and the injection time (period). It is determined whether the difference between the target urea injection amount and the real urea injection amount is larger than 50% of the target urea injection amount (S107), and then if the difference value is less than 50%, the average is updated at a 2400 km cycle based on the accumulated driving distance and is accumulated (S109).

Also, if the difference value is larger than the predetermined value, a timer is operated, the average of the difference value between the target urea injection amount and the real urea injection amount that are accumulated for 30 minutes is calculated (S113), then if the average value is larger than 50% of the target urea injection amount (S115), an alarm signal is generated to be transferred to a driver, and then the number of engine starts is counted and the driving distance is accumulated (S117). At this time, a lamp or a buzzer is turned on by the alarm signal, then the number of engine starts is counted from 1 and the travel distance is accumulated from 0 km.

After the accumulated travel distance reaches 50 km and the counted number of engine starts is less than a predetermined number, if the difference value between the target urea injection amount and the real urea injection amount is less than 50% of the target urea injection amount (S119), the average of the urea injection amount is updated at a 2400 km cycle based on the accumulated driving distance (S109). Also, after the counted number of engine starts is larger than a predetermined value and the accumulated travel distance reaches 50 km (S121), if the difference value of the target urea injection amount and the real urea injection amount is less than 50% of the target urea injection amount, the output decrease logic is operated (S123). However, when the counted number of engine starts is less than a predetermined number and the accumulated travel distance reaches 50 km, if the difference value of the target urea injection amount and the real urea injection amount is larger than 50% of the target urea injection amount, it is determined that there is almost no remaining urea such that the restarting restriction logic is operated (S125).

Therefore, the urea consumption amount is continuously monitored, the remaining urea amount is accurately detected, and the urea recharging is induced in time such that excessive exhaust of the nitrogen oxide is prevented.

Figure 2:
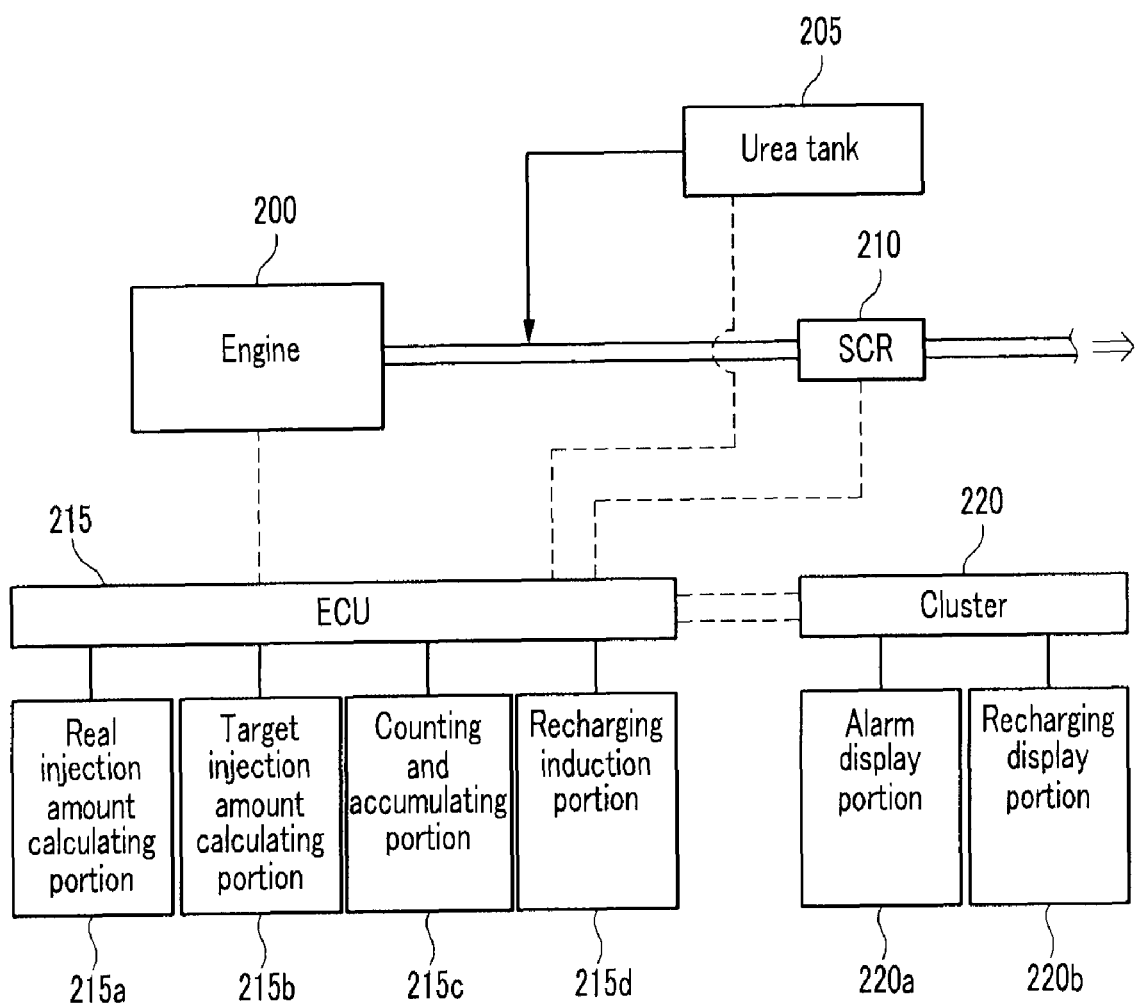
FIG. 2 is a schematic diagram of an exemplary selective catalyst reduction device according to the present invention.

FIG. 2 is a schematic diagram of a selective catalyst reduction device according to various embodiments of the present invention.

Referring to FIG. 2, a vehicle system includes an engine 200, an exhaust pipe, an injector, a selective catalyst reduction (SCR) device 210, a urea tank 205, an electronic control unit (ECU) 215, and a cluster 220.

The SCR 210 is disposed in the middle of the exhaust pipe, and the injector is disposed between the engine 200 and the SCR 210 and is connected to the urea tank 205.

The urea solution is injected according to a signal of the electronic control unit 215.

The electronic control unit 215 includes a real injection amount calculation portion 215a, a target injection amount calculation portion 215b, a counting and accumulation portion 215c, and a recharging induction portion 215d.

Further, an alarm display portion 220a and a recharge display portion 220b are provided in the cluster 220.

The structure and function of the constituent elements are well known to a person skilled in the art or are sufficiently described referring to the above FIG. 1, and so a detailed description well be omitted.

For convenience in explanation and accurate definition in the appended claims, the terms "inside" and etc. are used to describe features of the exemplary embodiments with reference to the relative positions of such features.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a urea-SCR system comprising:
   a first step of calculating a target urea injection amount;
   a second step of using urea injection pressure and urea injection time to calculate a real urea injection amount;
   a third step of calculating a difference value between the target urea injection amount and the real urea injection amount, and monitoring the difference value at a predetermined time interval;
   a fourth step of accumulating difference values for a determined time when the difference value exceeds a predetermined level, and transferring an alarm signal to a driver when the average value thereof exceeds a predetermined level; and
   a fifth step of starting to accumulate a number of engine starts and driving distance after transferring the alarm signal, and when the number of engine starts is larger than a predetermined value or the driving distance is longer than a predetermined value, if the difference value does not become lower than a predetermined level, recharging a urea tank with a urea solution.

2. The method for controlling a urea-SCR system of claim 1, wherein;
   engine speed and fuel supply amount are measured and an initial $NO:NO_2$ ratio value of initial $NO_x$ is detected;
   an $NO_2$ increment is estimated through temperature of a diesel oxidation catalyst (DOC) and an $NO_2$ decrement is analyzed through a pressure difference change amount through a catalytic particulate filter (CPF);
   temperature and continuous regeneration trap (CRT) effectiveness are compared to the initial $NO:NO_2$ ratio value to calculate a final $NO:NO_2$ ratio value; and
   whereby a reaction molecular ratio with an $NH_3$ and $NO_x$ purification efficiency of the SCR catalyst is determined to calculate the target urea injection amount in the first step.

3. The method for controlling an urea-SCR system of claim 1, wherein the real urea injection amount value is displayed on an instrument cluster in real time for the driver to check the real urea injection amount in the second step.

4. The method for controlling a urea-SCR system of claim 1, wherein the fourth step further includes a step of updating the average difference value at a predetermined cycle based on the accumulation value of the driving distance if the difference value between the target urea injection amount and the real urea injection amount is less than the predetermined value.

5. The method for controlling an urea-SCR system of claim 1, wherein the recharging is accomplished with an output reduction logic that reduces the output of the engine and a restarting restriction logic that causes the engine to not be restarted in the fifth step.

6. The method for controlling an urea-SCR system of claim 5, wherein the output restriction logic is operated if the number of engine starts after transferring the alarm signal is larger than a predetermined value, and the restarting restriction logic is operated if the accumulation value of the driving distance is longer than a predetermined value and the difference value between the target urea injection amount and the real urea injection amount is larger than a predetermined value.

7. A selective catalyst reduction device control system, comprising:
   a selective catalyst reduction device that is mounted on an exhaust pipe so as to eliminate nitrogen oxide that is included in exhaust gas;
   a urea tank in which a urea solution is stored;
   an injector that injects the urea solution supplied from the urea tank; and
   a control portion that calculates a target injection amount and a real injection amount that is to be injected from the injector, and that generates an alarm signal if the difference value between the target injection amount and the real injection amount is larger than a predetermined value;
   wherein the control portion includes:
      a counting portion that counts a number of engine starts after generating the alarm signal;
      an accumulating portion that accumulates the driving distance after generating the alarm signal; and
      a recharging induction portion that generates a recharging signal for recharging the urea tank with a urea solution if the difference value is larger than the predetermined value, if the number of engine starts or the accumulated driving distance is larger than the predetermined value.

8. The selective catalyst reduction device control system of claim 7, wherein the recharging induction portion prevents the engine from being started.

9. The selective catalyst reduction device control system of claim 7, wherein the recharging induction portion restricts the engine output so that the amount of exhaust gas is decreased.

10. The selective catalyst reduction device control system of claim 7, wherein the control portion updates the average of the difference value at a predetermined cycle, when the difference value between the target injection amount and the real injection amount is less than the predetermined value.

11. The selective catalyst reduction device control system of claim 7, wherein an alarm lamp or an alarm sound (voice) is turned on by the alarm signal.

12. The selective catalyst reduction device control system of claim 7, wherein a recharging lamp or a recharging sound (voice) is turned on by the recharging signal.

* * * * *